(12) United States Patent
Godau et al.

(10) Patent No.: US 9,715,474 B2
(45) Date of Patent: Jul. 25, 2017

(54) METHOD FOR SYNCHRONIZING DISPLAY ELEMENTS IN A CONTROL SYSTEM FOR AUTOMATED CONTROL OF A TECHNICAL INSTALLATION

(71) Applicant: Pilz GmbH & Co. KG, Ostfildern (DE)

(72) Inventors: Thorsten Godau, Ostfildern (DE);
Christian Adams, Ostfildern (DE);
Reinhard Sperrer, Ostfildern (DE);
Dietmar Seizinger, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 203 days.

(21) Appl. No.: 14/599,601

(22) Filed: Jan. 19, 2015

(65) Prior Publication Data

US 2015/0134865 A1    May 14, 2015

Related U.S. Application Data

(63) Continuation of application No. PCT/EP2013/065096, filed on Jul. 17, 2013.

(30) Foreign Application Priority Data

Jul. 20, 2012 (DE) .................. 10 2012 106 601

(51) Int. Cl.
*G05B 19/042* (2006.01)
*G05B 15/02* (2006.01)
*G06F 13/42* (2006.01)

(52) U.S. Cl.
CPC ......... *G06F 13/4221* (2013.01); *G05B 15/02* (2013.01); *G05B 19/0428* (2013.01); *G05B 2219/23172* (2013.01)

(58) Field of Classification Search
CPC ............ G06F 13/4221; G05B 19/0428; G05B 2219/23172
See application file for complete search history.

(56) References Cited

U.S. PATENT DOCUMENTS 5,966,079 A * 10/1999 Tanguay ................ G08B 17/10
340/628
6,356,795 B1    3/2002 Barthel et al.
(Continued)

FOREIGN PATENT DOCUMENTS

CN    101534593 A    9/2009
CN    201312400 Y    9/2009
(Continued)

OTHER PUBLICATIONS

Chinese Office Action for Serial No. 2016061501594650; issued Jun. 20, 2016; 7 pp.
(Continued)

*Primary Examiner* — Tim T Vo
*Assistant Examiner* — Herve Iradukunda
(74) *Attorney, Agent, or Firm* — Harness, Dickey & Pierce, P.L.C.

(57) ABSTRACT

A method for synchronizing display elements of a plurality of subscribers of a distributed, bus-based control system is proposed. The subscribers comprise a message transmitter and a plurality of message receivers. The message receivers each comprise a respective display element, which can be toggled between a switched-on state and a switched-off state, and a control unit for producing a control signal for toggling the display element from one state to the other. The message transmitter sends a respective current bus message via the bus in defined recurring bus message time intervals. The respective bus message comprises a bus message counter that has a respective value from a defined value range. The counter value is changed in a predefined manner each
(Continued)

time when a current bus message is sent. The message receivers receive the respective bus messages via the bus. The control units each evaluate the respective bus message counter in the same manner and take this as a basis for producing the control signal, so that the display elements are toggled between the switched-on state and the switched-off state in sync with one another and with a defined on/off period.

11 Claims, 6 Drawing Sheets

(56) References Cited

U.S. PATENT DOCUMENTS

| | | | |
|---|---|---|---|
| 7,715,932 B2 | 5/2010 | Seizinger | |
| 8,144,718 B2 | 3/2012 | Schwenkel | |
| 8,369,966 B2 | 2/2013 | Holzaepfel et al. | |
| 2010/0117850 A1* | 5/2010 | McCaslin | G08B 5/36 340/815.4 |
| 2010/0127632 A1* | 5/2010 | Briggs | H05B 33/0842 315/250 |
| 2011/0080294 A1 | 4/2011 | Tanishima et al. | |
| 2012/0004516 A1 | 1/2012 | Eng et al. | |

FOREIGN PATENT DOCUMENTS

| | | |
|---|---|---|
| CN | 201 636 609 U | 11/2010 |
| CN | 201681588 U | 12/2010 |
| CN | 102186000 A | 9/2011 |
| CN | 102595704 A | 7/2012 |
| DE | 196 25 195 A1 | 1/1998 |
| DE | 10 2010 063 089 A1 | 6/2012 |
| WO | WO2004/097539 A1 | 11/2004 |
| WO | WO2006/069691 A1 | 7/2006 |
| WO | WO2009/092548 A1 | 7/2009 |

OTHER PUBLICATIONS

International Search Report; mailed Oct. 10, 2013; 2 pp.
CEI IEC 61508-2; Functional safety of electrical/electronic/programmable electronic safety-related systems—Part 2: Requirements for electrical/electronic/programmable electronic safety-related systems; May 2000; 152 pp.
EN 954-1; Safety-related parts of control systems; Part 1: General principles for design; Mar. 1997; 34 pp.
PSS SW Ethernet Parameter Set-up Operating Manual, Item No. 20 576-02; Oct. 2010; 6 pp.
SafetyNET p System Description, Version 1.1; Aug. 2008; 43 pp.
PSSuniversal, Programmable control systems PSS®, System Description—No. 21256-EN-04; Oct. 2010; 89 pp.
Safety of machinery, Notes on the application of standards EN 62061 and EN ISO 13849-1; Jun. 2007; 19 pp.
Fachausschuss "Elektrotechnik" Pruef- und Zertifizierungsstelle im BG-PRUEFZERT: Grundsatz fuer die Pruefung und Zertifizierung von "Bussystemen fuer die Uebertragung sicherheitsrelevanter Nachrichten;" May 2002; 35 pp.
ISA/EP; English language translation of International Preliminary Report on Patentability (Chapter 1); issued by WIPO Jan. 20, 2015; 10 pp.

* cited by examiner

METHOD FOR SYNCHRONIZING DISPLAY ELEMENTS IN A CONTROL SYSTEM FOR AUTOMATED CONTROL OF A TECHNICAL INSTALLATION

CROSS-REFERENCES TO RELATED APPLICATIONS

This application is a continuation of international patent application PCT/EP2013/065096 filed on Jul. 17, 2013 designating the U.S., which international patent application has been published in German language and claims priority from German patent application DE10 2012 106 601.9 filed on Jul. 20, 2012. The entire contents of these priority applications are incorporated herein by reference.

BACKGROUND OF THE INVENTION

The present invention relates to a method for synchronizing display elements which are arranged in and distributed over a plurality of subscribers of a control system for the automated control of a technical installation.

By way of example, a pertinent control system is a programmable controller, as marketed under the trademark PSS® by the assignee and described in "PSSuniversal, Programmable Control Systems PSS®, System Description, No. 21256-EN-04". This control system is used for the automated control of a technical installation, particularly but not exclusively for controlling a safety-critical process that requires failsafe operation in order to avoid a danger to people. In particular, it involves the monitoring and control of installations operating in an automated fashion that have a risk of injury to people arising from their operation. Usually, such an installation is safeguarded by means of protective fences, protective doors, light barriers, light grids, emergency off pushbuttons and other safety sensors. As soon as a protective door is opened, a light barrier is interrupted or an emergency off pushbutton is operated, the installation needs to be stopped or put into a safe state in another manner. This is usually achieved by virtue of a controller in failsafe form evaluating state signals from the protective doors, light grids, emergency off pushbuttons etc., in defined recurring time intervals and taking this as a basis for operating safety-relevant actuators, such as contactors, that are arranged in the power supply path for the electrical drives of the installation. Frequently, the sensors and actuators are physically remote from the controller. In the case of a relatively large installation having a large number of sensors and actuators, it is possible for the controller to be connected to the sensors and actuators via what is known as a field bus system. The field bus system allows the interchange of digital data that represent the states of the sensors and actuators and also control commands from the controller. An example of such a field bus system is SafetyBUS p or SafetyNet p PSSuniversal includes a modular controller for standard and safety tasks. The controller comprises a header module and a plurality of input/output modules that are arranged to the right of the header module in strung-together fashion. The input/output modules communicate with the header module via a module bus (also called backplane bus). The system provides many options for diagnosis. By way of example, diagnosis can be made by means of LEDs on the input/output modules and the header module.

The LEDs can twinkle or flash, for example in a particular rhythm, to indicate a certain status. It is thus possible to indicate a particular operating state of the system. One disadvantage is that said modules do not twinkle or flash in sync with one another. This can be irritating to the user, particularly because the modules are arranged close to one another or directly next to one another. In addition, out-of-sync twinkling or flashing can make simple "first-level" diagnosis difficult for the user.

There are methods for synchronizing subscribers in a network, particularly for synchronizing the time. By way of example, the brochure "SafetyNET p, Version 1.1, System Description" from Safety Network International e.V. (www.safety-network.de) discloses methods for synchronization between subscribers in the network. The methods initiate actions throughout the network at the desired instant, i.e. events synchronized on a network wide basis. In order to establish such methods on a network wide basis, each network subscriber requires an accurate clock that is in sync with the other subscribers. In this case, the accuracy of the clocks and of the synchronization determines the accuracy of the whole system. A measure that is used for the accuracy is jitter, the inaccuracy of the clocks in relation to one another. In the case of SafetyNET p, a high-precision master clock is used that uses synchronization mechanisms to continuously adjust the clocks of the other subscribers. The master clock itself can in turn be synchronized to world time atomic clocks. On the basis of precise, synchronous clocks, an action request can now be sent to the subscribers in advance, and these then perform the action at the required instant. Hence, transmission and execution are decoupled in time. This allows synchronization of the reading-in or output of data throughout the network. In SafetyNET p, all devices can synchronize the device clocks if this is necessary for the respective application. Synchronization of the SafetyNET p devices in real time frame network (RTFN) involves the use of the precision time protocol (PTP) standardized in IEEE 1588. In addition, the precise clock synchronization protocol (PCS) is used, which is optimized for use in real time frame line (RTFL). By way of example, WO 2006/069691 A1 describes such an RTFL method.

Such methods for synchronizing the time or time control methods are very involved and may produce a high bus load, however.

SUMMARY OF THE INVENTION

Against this background, it is an object of the present invention to provide a method for synchronizing display elements in a control system and a corresponding control system. In particular, it is an object of the present invention to provide a method and a corresponding control system in which the display elements are synchronized in a simple and/or inexpensive manner. It is another object of the present invention to increase user friendliness and/or safety.

According to one aspect of the invention, in a control system having subscribers connected via a bus, said subscribers comprising a message transmitter and a first and a second message receiver, wherein the first and second message receivers each comprise a display element, which can be toggled between a switched-on state and a switched-off state, and wherein the first and second message receivers each comprise a control unit for producing a control signal that toggles the display element between the switched-on state and the switched-off state, there is provided a method for synchronizing the display elements of said first and second message receivers, wherein the message transmitter cyclically sends a respective bus message via the bus in defined recurring bus message time intervals, the respective bus message comprising a bus message counter that has a respective value from a defined value range, wherein the message transmitter changes the value in a predefined manner for each respective bus message to be sent, with the value being reset when the end of the value range is reached, wherein the first and second message receivers each receive the respective bus message via the bus, and wherein the control units in each of the first and second message receivers evaluate the bus message counter and take this as a basis for producing the control signal, so that the display elements of the first and second message receivers are toggled between the switched-on state and the switched-off state in sync with one another and with a defined on/off period that is a function of the bus message counter.

According to a further aspect of the invention, there is provided a method for synchronizing display elements in a control system having at least one message transmitter and a plurality of message receivers connected via a communication bus, wherein the message receivers each comprise a display element, which can be toggled between a switched-on state and a switched-off state, and each comprise a control unit for producing a control signal that toggles the display element between the switched-on state and the switched-off state, wherein the message transmitter cyclically transmits a respective bus message via the bus thereby defining a bus message time interval, with the respective bus message comprising a bus message counter having counter value from a defined counter value range, the counter value changing in a predefined manner each time when a respective bus message is sent, wherein the message receivers each receive the respective bus messages via the bus, and wherein the control units of each message receiver evaluate the bus message counter and take this as a basis for producing the control signal, so that the display elements of the plurality of message receivers are toggled between the switched-on state and the switched-off state in sync with one another and with a defined on/off period that depends on the bus message counter value.

According to a yet another aspect of the invention, there is provided a control system for the automated control of a technical installation, comprising a message transmitter and a plurality of message receivers connected via a communication bus, wherein the message receivers each comprise a display element, which can be toggled between a switched-on state and a switched-off state, and a control unit for producing a control signal that toggles the display element between the switched-on state and the switched-off state, wherein the message transmitter is designed to send a respective bus message via the bus in a defined recurring bus message time interval, the bus message comprising a bus message counter that has a respective value from a defined value range, wherein the message transmitter is further designed to increase or decrease the respective value in a predefined manner each time when a respective bus message is sent, wherein the message receivers each are designed to receive the bus messages via the communication bus, and wherein the control units are respectively designed to evaluate the bus message counter in the respective bus message in the same manner and to take this as a basis for producing the control signal, so that the display elements are toggled between the switched-on and switched-off states in sync with one another and with a defined on/off period that is a function of the bus message counter.

According to yet another aspect of the invention, there is provided a bus message receiver for a control system having subscribers which communicate via a bus by using cyclically sent bus messages comprising a bus message counter having a value that changes from bus message to bus message in a predefined manner, said bus message receiver comprising a display element, which can be toggled between a switched-on state and a switched-off state, and a control unit for producing a control signal that toggles the display element between the switched-on state and the switched-off state, wherein the control unit is configured to evaluate the bus message counter in order to produce the control signal a function of the bus message counter value.

The new methods and control system thus exploit a bus message counter for synchronizing the display elements (e.g. LEDs). Typically, the bus message counter (also called bus cycle counter) is already provided in the control system, for example for the purpose of safeguarding the data transmission. Hence, the novel method and the novel control system may exploit mechanisms that are already existent. There is no need for an involved method for the relatively "trivial" task of synchronizing display elements (e.g. LEDs). It is therefore possible to achieve the synchronization of the display elements without modifying the existent message or telegram structures and without great additional implementation involvement.

The effect achieved by the control units evaluating the bus message counter in the same manner and actuating their display elements accordingly is that the display elements of the various message receivers are put into the switched-on and switched-off states in sync with one another, particularly using a defined or constant on/off period. In other words, the display elements twinkle or flash in sync with one another. The defined on/off period may therefore be called twinkle period or flash period. Particularly in the case of a control system in which the message receivers are arranged physically close to one another, such—to the human eye or the eye of the user—"synchronous" twinkling is advantageous. The evaluation in the same manner means particularly that the control unit or control units evaluates or each evaluate the bus message counter using a control algorithm (also called control logic or control program), said control algorithms being the same.

Advantageously, at least a first and a second message receiver can be used. The control unit of the first message receiver receives the bus message counter in the current bus message, and the control unit of the second message receiver likewise receives the bus message counter in the current bus message at more or less the same time. The control units of the first and second message receivers thus have the same input variable: the bus message counter. The control unit of the first message receiver evaluates the bus message counter using a first control algorithm, and the control unit of the second message receiver evaluates the bus message counter using a second control algorithm. The first and second control algorithms are the same in this case. Hence, the control units evaluate the bus message counters in the same manner. Depending on the result of the evaluation, the control signal for controlling the display element is produced.

Control signal is understood here to mean a digital or analog signal that transfers the display element from the switched-on state to the switched-off state or from the switched-off state to the switched-on state. Said control signal therefore toggles the display element on or off. By way of example, in the switched-on state, the display element may carry a current or be supplied with power, whereas in the switched-off state it carries no current or is not supplied with power. In this regard, it is possible, by way of example, to use a current or energy source and a switching element (e.g. transistor) connected thereto that is controlled by the control signal. The control algorithm may produce a certain signal with each evaluation, which certain signal indicates the switched-on or switched-off state of the display element. The control signal may be produced when the signal changes.

"Synchronous" or "in sync" is particularly intended to be understood to mean that the display elements are put into the same state (switched-on or switched-off state) at essentially the same time. In particular, the display elements are put into the switched-on and switched-off states using the same on/off period (also called frequency) and phase. On/off period and phase are derived from the bus message counter. In other words, the display elements twinkle or flash with synchronous frequency and phase. Thus, the twinkle frequency and the twinkle phase are synchronized. By contrast, the display elements would twinkle contrary to one another in the case of "asynchronous" twinkling, i.e. one display element would be in the switched-on state when the other display element is in the switched-off state, and vice versa. Such asynchronous twinkling and any visible phase shift can be avoided using the novel method and the novel control system, however.

A factor for achieving synchronism is the bus message counter. Firstly, the bus messages (also called data packets or telegrams) are sent with the bus message counter via the bus in a defined recurring bus message time interval. There is thus cyclic sending of the bus messages or cyclic bus communication. In the case of cyclic bus communication, the bus message time intervals are constant, particularly over the period of time for the operation of the bus communication.

Secondly, the bus message counter has a value from a defined value range and is changed in a predefined manner each time for sending, particularly for any sending. The bus message counter is therefore a "deterministic" counter or count. In the case of a deterministic bus message counter, the value range is constant, particularly over the period of time for the operation of the bus communication. Theoretically, the value range could be infinite. In practice, however, the value range is finite. When the end of said value range has been reached, the value of the bus message counter needs to be reset, particularly to its initial value, for example to zero. This resetting when the end of the value range is reached can be called "automatic overflow".

The value range may preferably be stipulated by the provided or defined magnitude of the bus message counter in the bus message (e.g. measured in bits or bytes). If n bits are provided for the bus message counter, the (maximum) value range is $2^n$. By way of example, this therefore results in a (maximum) value range of 256 for 8 bits, a (maximum) value range of 65 536 for 16 bits or a (maximum) value range of 4 294 967 296 for 32 bits. Alternatively, the value range can also be customized or may be smaller than the maximum value range defined by the magnitude, however.

In particular, the bus message counter is incremented by a stipulated, preferably integer, value each time for sending, particularly starting from zero. By way of example, the bus message counter can be incremented by one each time for sending. This is the preferred and probably simplest implementation. Purely theoretically, however, any other integer implementation can be effected. Alternatively, the bus message counter can also be decremented by a stipulated, preferably integer, value each time for sending, particularly starting from the maximum value of the value range. Alternatively, the bus message counter can be incremented or decremented by a real or noninteger value each time for sending. What is important is that the bus message counter is changed in a predefined or deterministic manner, which is therefore known to all subscribers.

Preferably, the bus messages with the bus message counter can arrive at the bus message receivers "more or less simultaneously" (e.g. within a few 10-100 μs). Otherwise, the message delay and the associated delayed evaluation of the bus message counter could result in a visible phase shift in the twinkling of the display elements. Particularly in the case of control systems in which the message receivers are arranged physically close to one another, message delays are usually not a problem, however. In particular, it may be important for the time between sending of the bus message with the bus message counter up until evaluation of the bus message counter to be more or less the same for each bus message receiver. This means that the evaluation in the various bus message receivers takes place more or less simultaneously. By way of example, in the case of a (cut-through) linear topography, there is per se already a certain delay or latency between two bus message receivers. The time that can influence a phase shift in the twinkling or flashing may be particularly the delay or latency in a bus message as it passes through each bus message receiver. In the control systems in question, this is usually so short that the bus messages arrive at each bus message receiver more or less simultaneously.

On the basis of the cyclic bus communication described above with a deterministic bus message counter and corresponding evaluation of the bus message counter in the same manner for the purpose of actuating the display elements, synchronization of the display elements is achieved. Even if a new message receiver is connected to the bus during operation of the bus communication, said new bus message receiver can use the bus message counter to explicitly determine when it needs to put its display element into the switched-on or switched-off state. In other words, even a message receiver that has just been connected knows how its display element can twinkle in sync with the other display elements.

To date, the bus message counter has been used particularly for a quite different purpose, namely to keep control of message transmission errors or message delays. By way of example, this is a prerequisite for certification of a network that is intended to be approved for transmitting safety-relevant messages in terms of the standards EN 954-1, IEC 61508 and EN ISO 13849-1. Measures for keeping control of such message transmission errors or message delays are described by way of example in the document "Prufgrundsatze für Bussysteme für die Übertragung sicherheitsrelevanter Nachrichten" [Testing principles for bus systems for the transmission of safety-relevant messages], which is published under the designation GS-ET-26 by the electrical engineering technical committee of the Hauptverband der gewerblichen Berufsgenossenschaften [Main society of commercial trade associations] in Germany. As a measure for keeping control of errors, this document describes what is known as a serial number, inter alia, which is appended to every message that transmitters and receivers exchange. This serial number can be defined as an additional data field that contains a number that changes in a predefined manner from message to message.

In addition, a serial number of this kind, for example for the aforementioned programmable controller PSS®, is described in the document "PSS SW Ethernet Parameter Set-up, Operating Manual, Item No. 20 575-02". In this case, the structure of a PLC header from the company INAT GmbH is described, which has reserved two bytes for what is known as a sequence number that has the value 0 at connection setup and is incremented whenever useful data are sent. This telegram counter is also used for additionally safeguarding the data transmission.

The novel method for synchronizing display elements and the novel control system thus use existing structures or established mechanisms that are in the form of the bus message counter (also called telegram counter). In contrast to the aforementioned methods for synchronizing the time or time control methods of the prior art, the novel method is less involved and produces less bus load for the relatively "trivial" task of synchronizing display elements. In addition, it is not possible for latencies to mean that although the twinkle phases of the bus subscribers would be constant or rigid they would have a distinct visible shift in relation to one another.

In the case of implementation on control units in the form of microcontrollers, for example, the novel method can manage without special peripherals (e.g. without pulse width modulation (PWM), timer or the like) and/or without library functions (e.g. floating point algorithms). By way of example, the novel method can be implemented using standard floating-point number operations, particularly in the interruption, in which cyclic process data interchange and/or polling of the bus message counter takes place anyway.

Overall, a method for synchronizing display elements in a control system and a corresponding control system are provided in which particularly the display elements are synchronized in a simple and/or inexpensive manner, since existing structures or established mechanisms are used. In addition, the synchronous twinkling or flashing is agreeable and not irritating to the user or observer of the system, which means that user friendliness, is increased. The user is also able to perform a simple "first-level" diagnosis by observing the display elements. The aforementioned object is therefore achieved completely.

In a refinement, the message receivers store the defined bus message time interval and/or the defined value range.

In this refinement, the bus message time interval and/or the defined value range are fixedly defined in the message receiver. This ensures that, at least during operation of the bus communication, all message receivers know the bus message time interval and/or the defined value range. It also ensures that, at least during operation of the bus communication, the bus message time interval and/or the defined value range remains or remain constant. In particular, the message receiver can respectively store both the bus message time interval and the defined value range. By way of example, the defined bus message time interval and/or the defined value range may be stored in a memory unit. By way of example, the defined bus message time interval and/or the defined value range may be hard-coded or stored upon initialization of the message receiver, particularly prior to operation of the bus communication. By way of example, the defined bus message time interval and/or the defined value range can be received from an external transmitter, such as the message transmitter, via the bus.

In a further refinement, the control unit counts the number of bus message counters in a defined period of time each time and uses this number and the defined period of time to ascertain the bus message time interval.

In this refinement, the bus message time interval does not need to be prescribed by an external source, but rather the message receiver or the control unit thereof can ascertain the bus message time interval itself each time. This increases the flexibility of the control system. This is of particular benefit when a new message receiver is connected to the bus that has not yet stored the bus message time interval. Even if the bus message time interval changes, for example, it is not necessary for every message receiver to be hard coded or initialized again.

In a further refinement, the message receiver respectively stores a desired on/off period and/or a desired duty ratio. The duty ratio is particularly the ratio of the duration of the switched-on state to the on/off period.

In this refinement, a desired on/off period and/or a desired duty ratio are fixedly defined in the message receiver. This ensures that, at least during operation of the bus communication, all message receivers know the desired on/off period and/or a desired duty ratio. It also ensures that, at least during operation of the bus communication, the desired on/off period and/or the desired duty ratio remains or remain constant. By way of example, the desired on/off period and/or the desired duty ratio may be stored in a memory unit. By way of example, the desired on/off period and/or the desired duty ratio may be hard coded or may be stored when the message receiver is initialized, particularly prior to operation of the bus communication. By way of example, the desired on/off period and/or the desired duty ratio can be received from an external transmitter, such as the message transmitter, via the bus. In particular, the message receiver can respectively store both the desired on/off period and the desired duty ratio. In this refinement, both a desired duty ratio and a desired on/off period can be attained. The duty ratio or the ratio is particularly less than or equal to one. By way of example, twinkling has a duty ratio of 1/2, i.e. the durations of the switched-on state and the switched-off state are the same. By way of example, flashing has a duty ratio of less than 1/2 (e.g. 1/4 or 1/5), i.e. the duration of the switched-on state is shorter than the duration of the switched-off state.

In a further refinement, a defined changeover limit that is the product of the value range and the desired duty ratio is used for the evaluation. The duty ratio is particularly the ratio of the duration of the switched-on state to the on/off period.

In a further refinement, the control unit evaluates the bus message counter by means of simple integer divisions each time.

In this refinement, the evaluation can be effected in a simple manner and the control algorithm is implemented in a simple manner. Preferably, the control unit produces the control signal by virtue of a simple if/then decision (also called if/else). Preferably, the control algorithm thus uses simple integer divisions and/or if/then decisions. This is a simple implementation and therefore provides an inexpensive system.

In a further refinement, a value range period that is the product of value range and bus message time interval is used for the evaluation. In particular, the value range period is divisible by the defined on/off period without remainder.

In this refinement, the value range period determines the period of time regarding how long it takes before the value of the bus message counter has counted or passed through its entire value range once. In particular, the control unit can ascertain the value range period each time. The effect achieved by the value range period being divisible by the determined, i.e. actual, on/off period without remainder is that the on/off period fits into the value range period exactly and hence there is no remainder. When the end of the value range is reached, the on/off period or the twinkling or flashing then also ends. It is therefore never possible for display elements to twinkle or flash contrary or asynchronously with respect to one another or for undesirable on or off times to arise. In addition, a message receiver that is newly connected to the bus can immediately ascertain the state of its display element, and the display element is in sync with the other display elements for the next control signal. If the integer is one, the value range of the bus message counter is split into precisely one on/off period or the value range is the same as the on/off period. If the integer is a multiple (i.e. greater than one), the value range of the bus message counter is split into a plurality of on/off periods.

In a further refinement, the value range period is an integer multiple of the defined on/off period. In particular, the integer multiple defines a scaling factor.

In this refinement, the value range of the bus message counter is split into a plurality of on/off periods. In other words, the defined on/off period is an integer proportion of the value range period. Thus, a plurality of on/off periods split into the value range. This ensures that the on/off period fits into the value range period exactly and there is therefore no remainder. When the end of the value range is reached, the on/off period or the twinkling or flashing then also ends. In this refinement, it is possible, at least approximately, for both the desired duty ratio and the desired on/off period to be attained. The determined, i.e. actual, on/off period can differ from the desired on/off period in this case if the value range period is not an integer multiple of the desired on/off period. The desired on/off period is "artificially stretched or shortened" or the on/off period is fitted into the value range period.

In a further refinement, the control unit ascertains the value range period as the product of value range and bus message time interval each time. The control unit ascertains the quotient of value range period and the desired on/off period each time. The control unit performs integer rounding of said quotient each time, the rounding result from which defines a scaling factor.

In this refinement, a simple implementation is provided for how the value range of the bus message counter can be split into a plurality of on/off periods or how the defined on/off period may be an integer portion of the value range period. This ensures that the on/off period fits into the value range period exactly and there is therefore no remainder. When the end of the value range is reached, the on/off period or the twinkling or flashing then also ends. In this refinement, it is possible, at least approximately, for both the desired duty ratio and the desired on/off period to be attained. The determined, i.e. actual, on/off period can differ from the desired on/off period in this case if the value range period is not an integer multiple of the desired on/off period.

In a further refinement, the control unit evaluates the bus message counter each time such that the modulo from the value of the bus message counter divided by the quotient of value range and scaling factor is compared with the quotient of defined changeover limit and scaling factor. The control signal is produced particularly if the modulo is above or below the quotient of defined changeover limit and scaling factor.

In this refinement, a simple implementation is provided for how the control signal can be produced, particularly when the value range is split into a plurality of on/off periods. In particular, the display element may have been put into the switched-on state when or while the modulo is less than the quotient of defined changeover limit and scaling factor, and/or the display element may have been put into the switched-off state when or while the modulo is greater than the quotient of defined changeover limit and scaling factor. The modulo is the remainder from the division.

In a further refinement, the control unit evaluates the bus message counter each time such that the modulo from the value of the bus message counter divided by the value range is compared with the defined changeover limit. The control signal is produced when the modulo is above or below the defined changeover limit.

This refinement is used particularly when the value range of the bus message counter has been split into precisely one on/off period or the value range is equal to the on/off period. When the end of the value range is reached, the on/off period or the twinkling or flashing then also ends. In this case, the scaling factor is one. It is therefore not necessary for the scaling factor to be taken into account for the evaluation. This provides an extremely simple form of implementation of the synchronous twinkling or flashing. In this refinement, it is possible, at least approximately, for a desired duty ratio to be attained. The determined, i.e. actual, on/off period is dependent on the defined value range and the bus message time interval, however. By way of example, if the modulo or the value of the bus message counter is above the firmly defined changeover limit, the control signal that takes the display element from the switched-on state to the switched-off state can be produced, and/or the control signal that takes the display element from the switched-off state back into the switched-on state can be produced no later than when the value of the bus message counter is reset.

In a further refinement, the value range is matched to the bus message time interval and/or the on/off period.

In this refinement, it is possible to prevent the last values of the value range from being "left over" or there being a remainder. By way of example, the value range can be chosen such that the value range period is greater than or at least equal to the on/off period. Even if the original value range is stipulated by the provided or defined magnitude of the bus message counter in the bus message, the value range can be customized. In particular, the new value range may be smaller than the maximum value range defined by the magnitude.

In a further refinement, the defined on/off period that is used to toggle the display element between the switched-on and switched-off states indicates a current operating state in the control system, particularly an error state in the control system.

In this refinement, the defined on/off period is an indicator of a determined operating state in the control system. Thus, diagnosis is possible. By way of example, the user can perform a simple "first-level" diagnosis by observing the display elements that twinkle or flash in sync with one another.

In a further refinement, for a first set of message receivers the display elements are alternately put into the switched-on and switched-off states in sync with one another using a first defined on/off period, and for a second set of message receivers the display elements are alternately put into the switched-on and switched-off states in sync with one another using a second defined on/off period.

In this refinement, a plurality of modes of operation can be indicated. This increases the diagnosis options for the control system. In particular, the control unit can perform the appropriate evaluation or calculations for each defined on/off period. By way of example, the first on/off period may be a twinkle period and the second on/off period may be a flash period. By way of example, the first and second defined on/off period may alternatively be various twinkle periods or various flash periods.

In a further refinement, the bus message time interval is shorter than 10 ms, particularly shorter than 1000 µs, particularly shorter than 100 µs, particularly shorter than 70 µs.

It goes without saying that the features cited above and those yet to be explained below can be used not only in the respectively indicated combination but also in other combinations or on their own without departing from the scope of the present invention.

BRIEF DESCRIPTION OF THE DRAWINGS

Exemplary embodiments of the invention are shown in the drawings and are explained in more detail in the description that follows. In the drawings.

DESCRIPTION OF PREFERRED EMBODIMENTS

Figure 1:
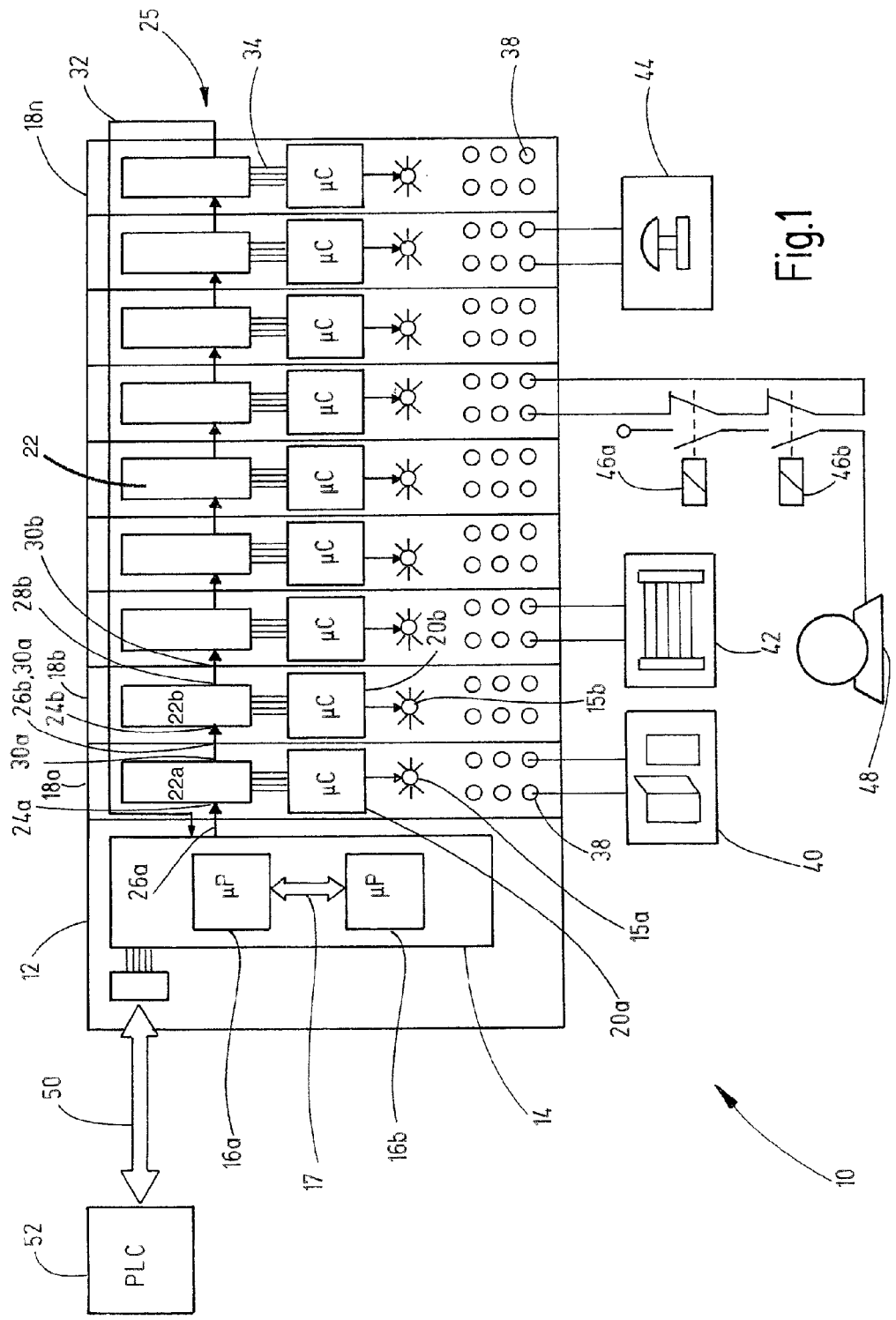
FIG. 1 shows a simplified illustration of a control system for the automated or safety-relevant control of a technical installation, with an exemplary embodiment of the novel method and of the novel bus message receiver being used.

FIG. 1 shows a simplified illustration of a control system 10 for the automated or safety-relevant control of a technical installation, with an exemplary embodiment of the novel method and of the novel bus message receiver being used.

In this case, the control system 10 is a modular control system that is used for the automated control of a technical installation. By way of example, the technical installation is a production line of an automobile manufacturer, a conveyor belt at an airport or another installation whose operation gives rise to a danger to people in the surroundings of the installation. In the preferred exemplary embodiments, the control system is capable of controlling safety-relevant functions and standard functions. The latter are functions that relate to the normal operating cycle of the installation. The former are functions that are used primarily to avoid accidents and injuries as a result of the operation of the installation. In principle, the novel method and the corresponding bus message receiver can also be used in other control systems, however, particularly controllers that control exclusively normal operating functions of an installation, or in pure safety controllers that control exclusively safety functions.

The control system 10 comprises a plurality of subscribers connected via a bus 25. The subscribers comprise at least one message transmitter 12 and a number of message receivers 18a, 18b, . . . , 18n. To simplify matters, only the first message receiver 18a and the second message receiver 18b will now be discussed. Each message receiver 18a, 18b comprises a display element 15a, 15b that can be toggled between a switched-on state and a switched-off state. In other words, the first message receiver comprises a first display element 15a and the second message receiver 18b comprises a second display element 15b. Each message receiver 18a, 18b additionally comprises a control unit 20a, 20b for producing a control signal that toggles the display element 15a, 15b between the states. In other words, the first message receiver 18a comprises a first control unit 20a and the second message receiver 18b comprises a second control unit 20b. The control signal produced by the control unit switches the display element 15 either from the switched-on state to the switched-off state or from the switched-off state to the switched-on state. This control signal therefore switches the display element 15a, 15b on or off. By way of example, it is possible to use a current or energy source and a switching element (e.g. transistor) connected thereto that is controlled by the control signal. In the switched-on state, the display element then carries a current and emits light, whereas in the switched-off state it carries no current and therefore does not emit light. However, it is also possible to use any other known and suitable type of actuation for a display element.

In the preferred exemplary embodiment, the display element 15a, 15b is a light-emitting diode (LED). This allows a simple and inexpensive diagnosis option. Alternatively, the display element may also be any other type of display element that can be put into a switched-on state and a switched-off state, or can twinkle and/or flash, at alternate times, however, for example another type of illuminant.

The defined on/off period $T_{ea}$ that is used to toggle each display element 15 between the switched-on and switched-off states indicates an existing operating state in the control system 10, particularly an error state in the control system. The defined on/off period is therefore an indicator of a determined operating state in the control system 10. By way of example, the user can perform a simple "first-level" diagnosis by observing the display elements 15 that twinkle or flash in sync with one another. It is naturally also possible for a plurality of modes of operation to be indicated simultaneously. By way of example, the first on/off period may be a twinkle period and the second on/off period may be a flash period. By way of example, a set of message receivers can twinkle or flash using a first defined on/off period and a second set of message receivers can twinkle or flash using a second defined on/off period. The first on/off period and the second on/off period indicate different modes of operation in this case.

Figure 2:
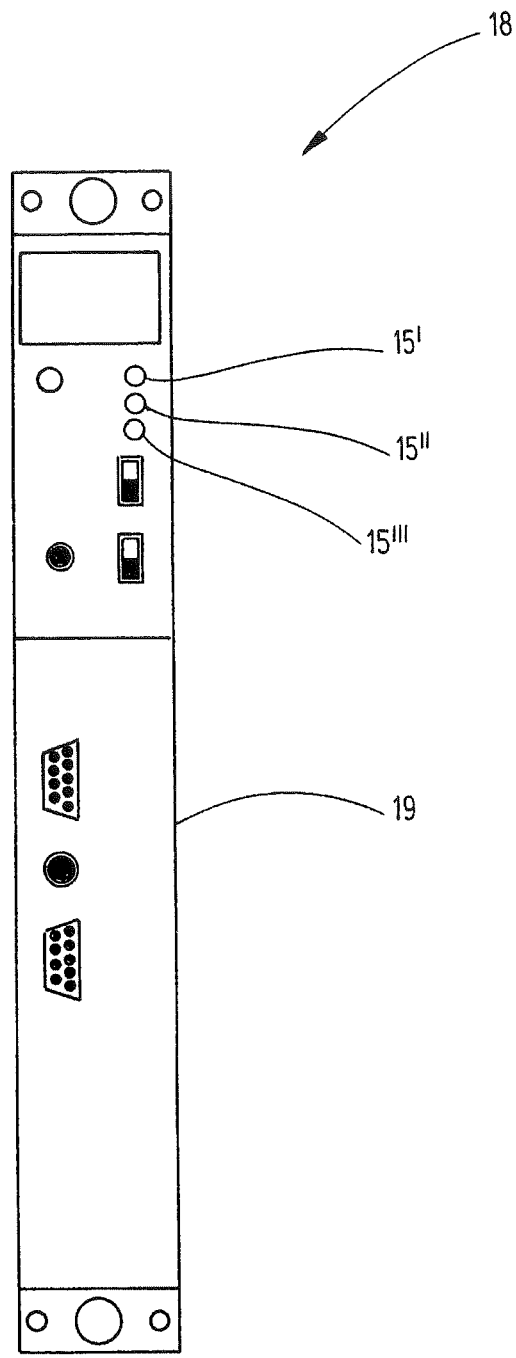
FIG. 2 shows a front view of a housing for an exemplary embodiment of a bus message receiver.

FIG. 2 shows a front view of a housing for an exemplary embodiment of a bus message receiver 18, for example a bus message receiver 18a, 18b, . . . , 18n in FIG. 1. The display elements are light-emitting diodes in the example shown in FIG. 2. The display elements or light-emitting diodes are arranged in corresponding cutouts in the housing 19 of the message receiver 18. The light-emitting diodes can be toggled between the switched-on and switched-off states, i.e. twinkle and/or flash, using one or more on/off periods each time. Alternatively, the light-emitting diodes may also be permanently in the switched-on state, i.e. can permanently or continuously emit light. The first and second light-emitting diodes each show an operating state of the control system, denoted in FIG. 2 by "RUN ST" for a standard part and "RUN FS" for a failsafe part. The third light-emitting diode is permanently in the switched-on state (i.e. emits light) when supply voltage is applied, denoted in FIG. 2 by "POWER".

Returning to FIG. 1, in this exemplary embodiment the message transmitter is a header portion 12 (also called header module) here, which in this case has a failsafe evaluation and control unit 14. In the preferred exemplary embodiments, the evaluation and control unit 14 has at least two processors 16a, 16b that execute a control program redundantly with respect to one another and monitor one another. This is shown in simplified form in FIG. 1 by a double-headed arrow 17. In this case, failsafe means that the header portion 12 meets at least the requirements of SIL2 of the international IEC 61508 standard and/or the requirements PL d of the EN ISO 13849-1 standard or comparable requirements.

In the exemplary embodiment of FIG. 1, the message receivers are in this case a series of I/O units 18a, 18b, ..., 18n (also called input/output modules). The I/O units 18 are used for receiving and outputting signals that the control system 10 uses to influence operation of the installation.

In a preferred exemplary embodiment, the I/O units 18 are electrically and mechanically connected to the header portion 12, as shown in simplified form in FIG. 1. In this case, the display elements 15 of the I/O units are arranged physically close to one another, so that—to the human eye or the eye of the user—"synchronous" twinkling is important. In other exemplary embodiments, however, it is also possible for the I/O units 18 to be arranged separately from the header portion 12 or separately from a controller corresponding to the header portion 12 and to communicate with the header portion 12 only via a communication link, which will be explained in more detail below.

Each I/O unit 18 has an aforementioned control unit 20 that is implemented by means of a microcontroller, for example. Instead of a microcontroller, the control unit 20 may be implemented as an ASIC, as an FPGA, using more powerful microprocessors or using other logic chips (e.g. CPLD).

The control unit 20 is designed to evaluate the bus message counter in the current bus message and to take this as a basis for producing the control signal. In other words, the first control unit 20a is designed to evaluate the bus message counter in the current bus message and to take this as a basis for producing a first control signal for the first display element 15a, and the second control unit 20a is designed to evaluate the bus message counter in the current bus message and to take this as a basis for producing a second control signal for the second display element 15b. The evaluation is performed in the same manner in this case.

In particular, each control unit 20a, 20b has a control algorithm (also called control logic or control program) implemented therein. This control algorithm is used to evaluate the bus message counter. The control algorithm in each of the control units 20a, 20b is the same. In other words, the first control unit 20a of the first message receiver 18a evaluates the bus message counter using a first control algorithm, and the control unit 20b of the second message receiver 18b evaluates the bus message counter using a second control algorithm, the first and second control algorithms being the same. On the basis of the result of the evaluation or of the control algorithm, the control signal for controlling the relevant display element 15a, 15b is then produced. The control signal for controlling the first display element 15a and the control signal for controlling the second display element 15b are produced at more or less the same time. Hence, the first display element 15a and the second display element 15b are put into the same state (switched-on or switched-off state) at the same time. The first display element 15a and the second display element 15b are thus toggled between the switched-on and switched-off states in sync with one another using the defined on/off period $T_{ea}$. In other words, the display elements 15a, 15b twinkle or flash. This will be explained in more detail below with reference to FIG. 3 to FIG. 6.

In order to implement a plurality of modes of operation, the first and second message receivers 15a, 15b, i.e. a first set of message receivers, may have stored a first desired on/off period and/or a first desired duty ratio and use a first control algorithm that is the same, and a third and a fourth message receiver, i.e. a second set of message receivers, may have stored a second desired on/off period and/or a second duty ratio. In order to achieve a first on/off period and a second, different on/off period, for example, the first and second message receivers can store a first desired on/off period and use a first control algorithm that is the same and the third and fourth message receivers can store a second desired on/off period and use a second control algorithm that is the same.

Furthermore, in the present exemplary embodiment, each I/O unit 18 additionally has a communication unit 22 (also called bus interface). By way of example, the communication unit may be implemented as an FPGA. Alternatively, the communication unit may be implemented as a microcontroller, as an ASIC, using more powerful microprocessors or using other logic chips (e.g. CPLD). In principle, it is possible for the communication unit 22 and the control unit 20 to be integrated to form a common communication and control unit and/or for the function of the communication unit 22 to be implemented by means of suitable programming of a microcontroller.

The header portion 12 and the I/O units 18 are connected to one another via the aforementioned bus 25. The message transmitter or the header portion 12 is designed to send a respective current bus message via the bus 25 in a defined recurring bus message time interval $T_{Bus}$. There is thus "cyclic" sending of the bus messages or cyclic bus communication, in the case of which the bus message time intervals are constant.

Each bus message comprises a bus message counter. By way of example, each bus message may comprise header data (also called header) and process data. By way of example, the bus message counter may be part of the header data. The bus message counter has a value Z from a defined value range W. Whenever a current bus message is sent, the message transmitter or the header portion 12 alters the value Z in a predefined manner. When the end of the value range is reached, the value Z is reset.

Each message receiver or I/O unit 18a, 18b receives the sent bus messages via the bus 25. The control unit 20a of the first message receiver 20a and the control unit 20b of the second message receiver 18b receive the bus message counter in the current bus message at more or less the same time. In the exemplary embodiment of FIG. 1, the communication unit 22a, 22b has a respective input 24a, 24b to which a first data line 26 is connected. The latter is used by the I/O unit 18a, 18b to receive the bus messages. The communication unit 22a, 22b can evaluate or understand the respectively current bus message and forward appropriate information, such as the bus message counter, to the control unit 20a, 20b. The control units 20a, 20b of the first and second message receivers 18a, 18b therefore have the same input variable for the control algorithm, namely the same bus message counter.

In the exemplary embodiment shown in FIG. 1, the communication unit 22a, 22b additionally has a respective output 28a, 28b to which a second data line 30a, 30b is connected (shown in FIG. 1 using the example of the I/O unit 18n). In the preferred exemplary embodiment, the first data line 26a, 26b and the second data line 30a, 30b together form a serial data line that is routed through all the communication chips 22 of the I/O units 18. In the exemplary embodiment shown, the serial data line connects the I/O units 18 to the header portion 12. From the last communication chip 22 in the series, a further data line 32 is routed back to the evaluation and control unit 14 of the header portion 12, so that overall a ring-shaped bus 25 is obtained that the evaluation and control unit 14 of the header portion 12 can use to communicate with the I/O units 18.

The novel method or the novel control system is not limited to the ring-shaped bus shown here. It can likewise be used with other bus topologies, for example with a simple point-to-point connection, in a star topology, in a tree topology or in a linear topology.

Each message receiver 18 may have a memory that stores the parameters of the defined bus message time interval $T_{Bus}$ and the defined value range W. The memory of the message receiver may also store the parameters of a desired on/off period $T^*_{ea}$ and/or a desired duty ratio $V^*$ (particularly less than or equal to one). The duty ratio $V^*$ is the duration of the switched-on state in relation to the on/off period. The parameters may be hard coded or can be stored when the message receiver 18 is initialized, particularly prior to operation of the bus communication. By way of example, the defined bus message time interval $T_{Bus}$ and the defined value range W can be received from the message transmitter 12 via the bus 25. Alternatively, each message receiver 18 or the control unit 20 thereof can also ascertain the bus message time interval $T_{Bus}$ itself, however, by virtue of the control unit 20 counting the number of bus message counters in a defined period of time and then using said number and the defined period of time to ascertain the bus message time interval $T_{Bus}$.

In this case, each communication unit 22 has a further output 34 in which the communication unit 22 provides data for the control unit 20. In particular, the communication unit 22 can thus provide the control unit 20 with the bus messages having the bus message counter. The output 34 may be a register or memory area or a logical data transfer point in a schedule if the communication unit 22 is integrated in the control unit 20.

The control unit 20 can be used not only to produce the control signal for the display element. The control unit 20 can additionally send data to the communication unit 22. The communication unit 22 can receive the data from the control unit 20 and integrate them into the serial datastream that is sent via the output 28 of the next communication unit. Accordingly, the output 34 may be a bidirectional input and output interface.

Each I/O unit 18 has a plurality of ports 38 to which sensors and/or actuators can be connected. By way of example, a protective door switch 40, a light grid 42, an emergency off pushbutton switch 44 and two contactors 46a, 46b are shown in this case. The contactors 46a, 46b can be used via the control system 10 to interrupt the supply of power to an electric motor 48, for example if the protective door sensor 40 signals that a protective door has been opened. The sensors 40, 42, 44 and actuators 46, 48 are shown by way of example in this case. In practice, further sensors and/or actuators may be connected to the control system 10, for example rotation speed sensors, temperature sensors, position sensors or solenoid valves. The control unit 20 may be connected to the ports 38 such that data that represent a respective current state of the sensors and/or actuators are produced.

The evaluation and control unit 14 of the header portion 12 can collect the data that represent a respective current state of the sensors and actuators via the I/O units 18 in the cyclically recurring bus message time intervals. The evaluation and control unit 14 can then process the collected data and take this as a basis for producing further data that are transmitted to the control units 20 of the I/O units 18. By way of example, the further data may contain a control command that results in the supply of power for the motor 48 being interrupted by means of the contactors 46. Furthermore, the data may contain information that relates to a current state of the I/O units themselves, particularly diagnosis information and/or configuration information.

Besides the "internal" communication link to the I/O units 18, the control system 10 may also an external communication link, which is shown in simplified form in FIG. 1 by the double-headed arrow 50. The external communication link may be a field bus that the header portion 12 uses to communicate with other units, for example with another controller 52 or control system. The novel method is particularly well suited to cyclic communication by the header portion 12 (or the evaluation and control unit 14 thereof) with the I/O units 18. Alternatively, the novel method can be used in said field bus.

FIG. 3 to FIG. 6 each show the time profile for the state of the display elements 15a, 15b according to various exemplary embodiments of the method. FIG. 3a, FIG. 4a, FIG. 5a and FIG. 6a each plot the value Z of the bus message counter over time. FIG. 3b, FIG. 4b, FIG. 5b and FIG. 6b each show the time profile for the state of a display element 15a of a first message receiver 18a, and FIG. 3c, FIG. 4c, FIG. 5c and FIG. 6c each show the time profile for the state of a display element 15b of a second message receiver 18b. In this case, the switched-on state of the relevant display element 15a, 15b is denoted by E and the switched-off state is denoted by A. The duration of the switched-on state is denoted by $T_e$, and $T_a$ denotes the duration of the switched-off state. A duration $T_e$ and a duration $T_a$ together yield the determined or actual on/off period $T_{ea}$.

As can be seen in FIG. 3a, FIG. 4a, FIG. 5a or FIG. 6a, the bus message counter has a value Z from a defined value range W, i.e. the bus message counter can assume W different values. In these exemplary embodiments, the value Z ranges from 0 to W−1. By way of example, a (maximum) value range W of 65 536 is obtained for the bus message counter in the case of 16 bits. Whenever sending takes place, i.e. after (or at an interval of) every bus message time interval $T_{bus}$, the value Z is changed in a predefined manner. In the exemplary embodiments shown, the value Z is incremented by the integer value 1 whenever sending takes place (at the interval $T_{bus}$), starting from zero. Accordingly, the value Z corresponds to 0, 1, 2, 3, . . . , W−1, i.e. until the (maximum) value range W is reached. When the end of this value range W is reached, the value Z of the bus message counter is reset, in this case to its initial value zero. A value range period $T_W$ (also called overflow period) indicates the period of time for how long it takes before the value Z of the bus message counter has counted or passed through its entire value range W once. The value range period $T_W$ is obtained as the product of value range W and bus message time interval $T_{bus}$. The value range W, and hence also the value range period $T_W$, is constant, as can be seen in FIG. 3a, FIG. 4a, FIG. 5a or FIG. 6a.

As can be seen from the comparison of FIGS. 3b and 3c, FIGS. 4b and 4c, FIGS. 5b and 5c or FIGS. 6b and 6c, the display element 15a of the first message receiver 18a and the display element 15b of the second message receiver 18b are toggled between the switched-on state E and the switched-off state A in sync with one another using the defined on/off period $T_{ea}$. The display elements 15a, 15b are thus put into the same state (switched-on state E or switched-off state A) at the same time, i.e. in sync with one another. The display elements 15a, 15b are toggled between the switched-on state E and the switched-off state A using essentially the same on/off period $T_{ea}$ (or frequency) and phase. The display elements thus twinkle or flash using synchronous frequency and phase.

Figure 3:
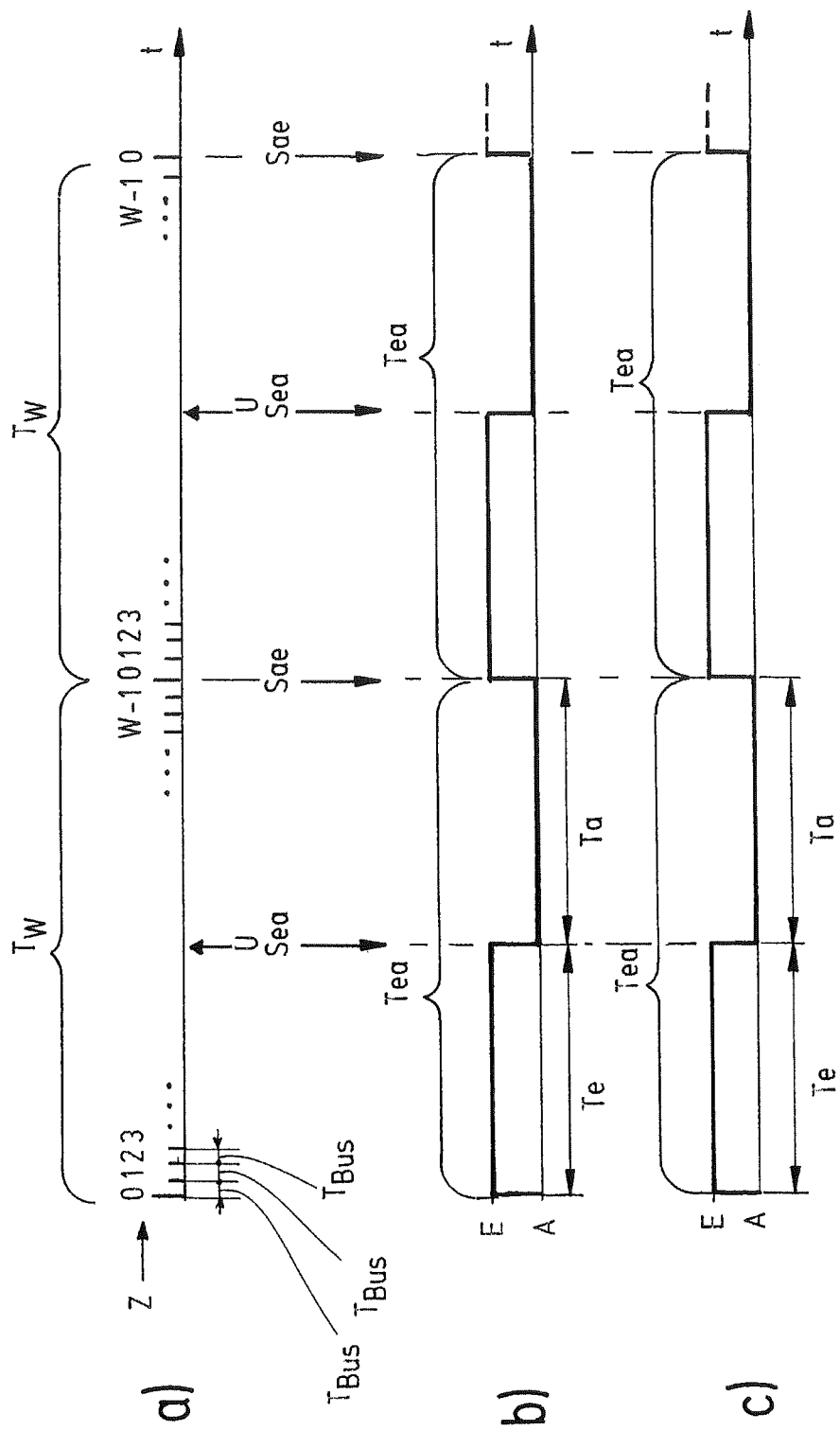
FIG. 3 shows the time profile for the state of the display elements according to a first exemplary embodiment of the method.
Figure 5:
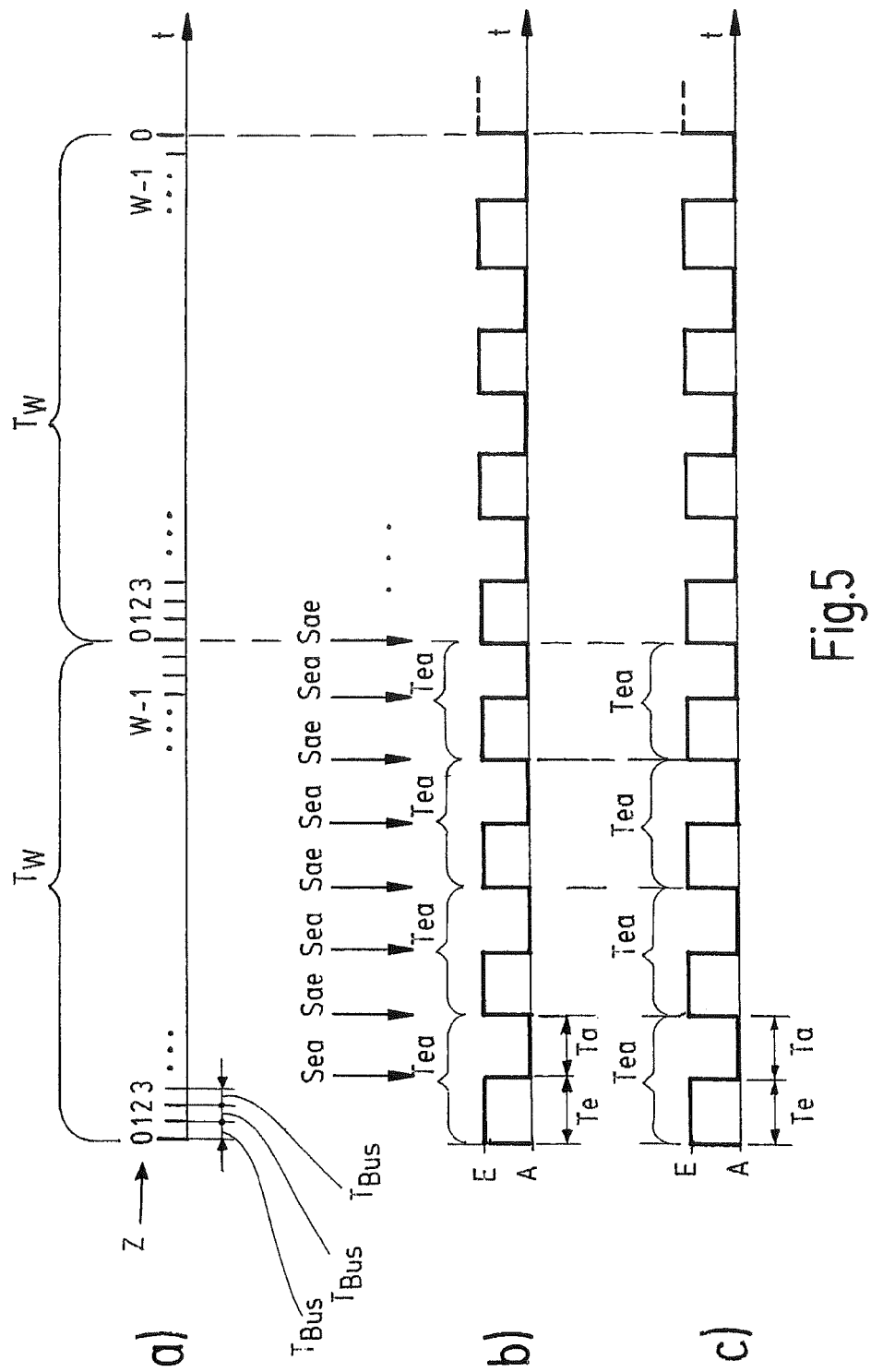
FIG. 5 shows the time profile for the state of the display elements according to a second exemplary embodiment of the method.

In the exemplary embodiment of FIG. 3 and the exemplary embodiment of FIG. 5, the duty ratio V, i.e. the ratio of the duration of the switched-on state $T_e$ to the on/off period $T_{ea}$, is 1/2 each time. The duration of the switched-on state $T_e$ and the duration of the switched-off state $T_a$ are thus the same in this case. Hence, the display elements twinkle in each of these exemplary embodiments.

Figure 4:
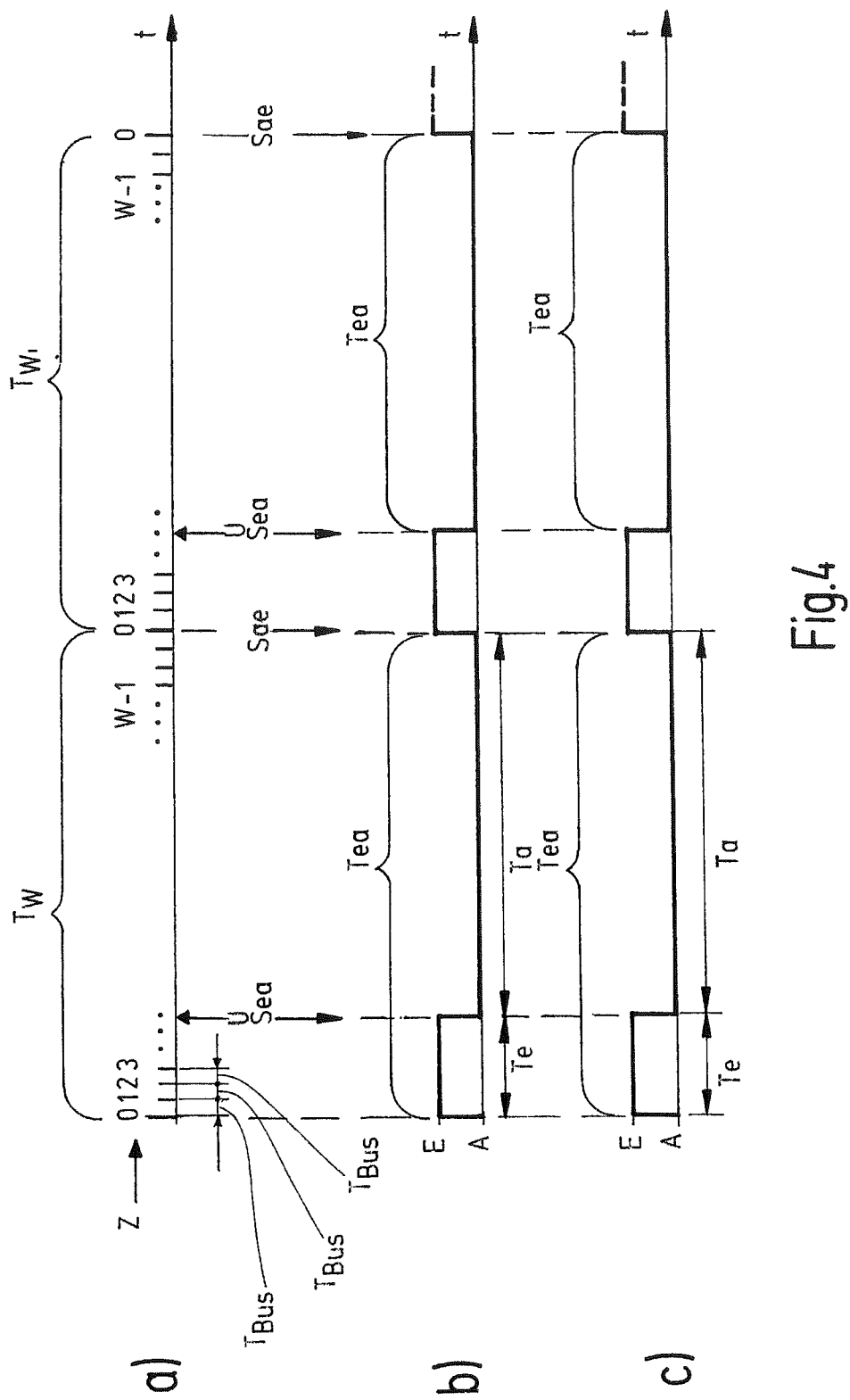
FIG. 4 shows the time profile for the state of the display elements according to a second exemplary embodiment of the method.
Figure 6:
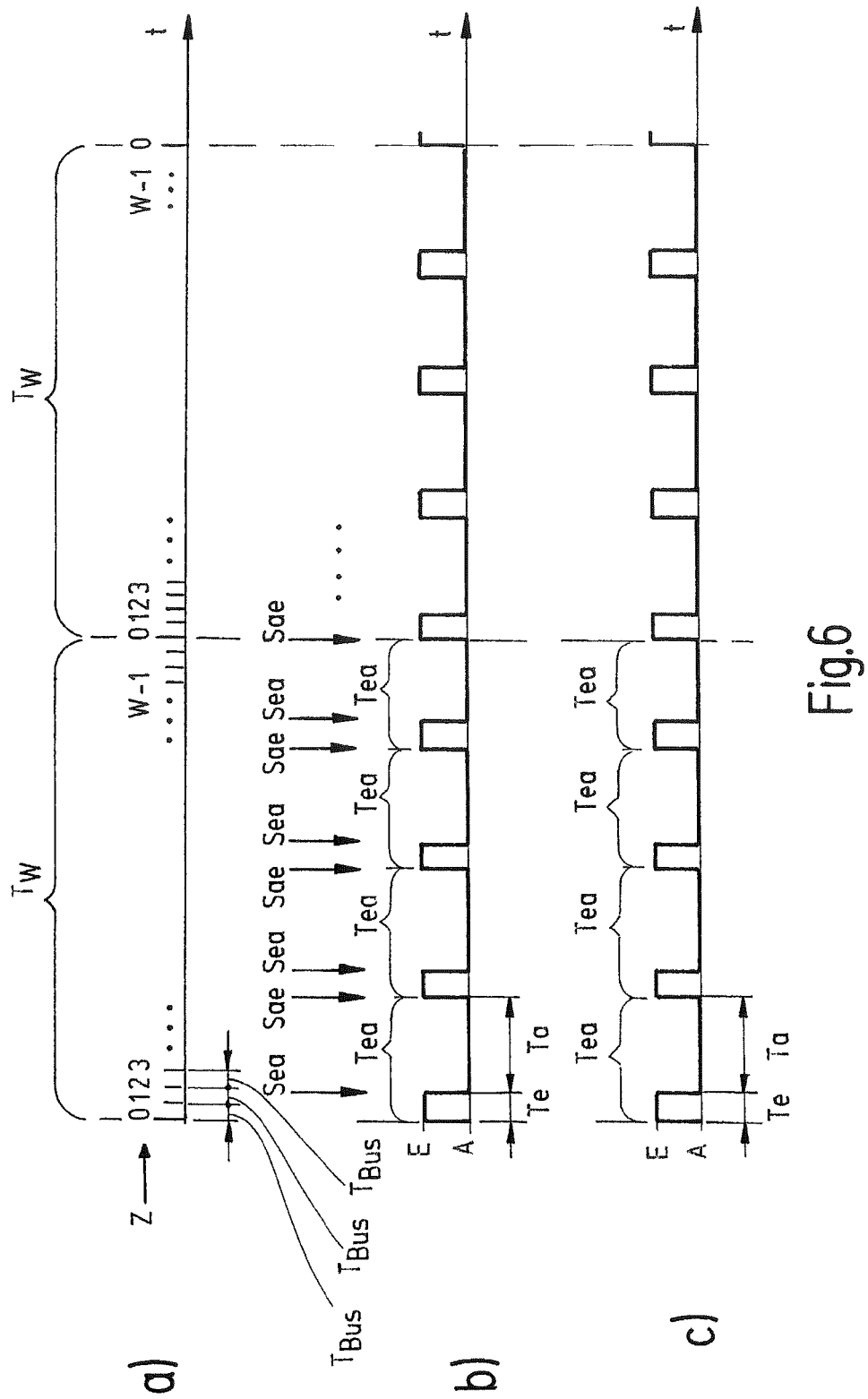
FIG. 6 shows the time profile for the state of the display elements according to a second exemplary embodiment of the method.

In the exemplary embodiment of FIG. 4 and the exemplary embodiment of FIG. 6, the duty ratio V, i.e. the ratio of the duration of the switched-on state $T_e$ to the on/off period $T_{ea}$, is less than 1/2 each time, in this case 1/5, for example. The duration of the switched-on state $T_e$ is thus shorter than the duration of the switched-off state in this case. Hence, the display elements flash in each of these exemplary embodiments.

In each of the exemplary embodiments of FIG. 3 to FIG. 6, the value range period $T_W$ can be divided on an integer basis by the defined on/off period $T_{ea}$. The effect achieved by the value range period $T_W$ being able to be divided on an integer basis by the determined, i.e. actual, on/off period $T_{ea}$ is that the on/off period $T_{ea}$ fits into the value range period W on an integer basis and there is therefore no remainder. When the end of the value range W is reached, the on/off period $T_{ea}$ or the twinkling or flashing then also ends.

In the exemplary embodiment of FIG. 3 and the exemplary embodiment of FIG. 4, the value range period $T_W$ is divisible by the on/off period $T_{ea}$ precisely once (without remainder). In this case, the integer is thus one. The value range W of the bus message counter is thus split into precisely one on/off period $T_{ea}$ or value range W is equal to the on/off period $T_{ea}$. Thus, precisely one on/off period $T_{ea}$ fits in the value range W. When the end of the value range W is reached, the on/off period $T_{ea}$ or the twinkling or flashing therefore also ends. In the exemplary embodiment of FIG. 3 and the exemplary embodiment of FIG. 4, the actual duty ratio V may correspond, at least approximately, to the desired duty ratio V*. In other words, it is possible, at least approximately, to attain a desired duty ratio V*. The determined, i.e. actual, on/off period $T_{ea}$ is dependent on the defined value range W and the bus message time interval $T_{bus}$ however.

If the value range period $T_W$ is divisible by the on/off period $T_{ea}$ precisely once (without remainder), as shown in the exemplary embodiment of FIG. 3 and the exemplary embodiment of FIG. 4, the evaluation or the control algorithm can preferably proceed as follows: the modulo from the value of the bus message counter divided by the value range is compared with the defined changeover limit U. The control signal is produced if the modulo reaches or is above or below the defined changeover limit. The modulo (denoted by the operator %) is the remainder from the division. In this case, the changeover limit is the product of the value range W and the desired duty ratio V*:

$$U = W \cdot V^*.$$

By way of example, this evaluation or the control algorithm can be described by means of the following pseudo code:

```
If (LED == target_twinkling)
{
    If (Z% W < U)
    {
        LED = on
    }
    else
    {
        LED = off
    }
}
```

Alternatively, the bus message counter can also simply be compared with a defined changeover limit U, and the control signal is produced if the bus message counter reaches or is above or below the defined changeover limit U.

In the exemplary embodiment of FIG. 3, the changeover limit U is therefore 1/2·W. This means that the display elements or LEDs twinkle. In the exemplary embodiment of FIG. 4, the changeover limit U is 1/5·W, however. This means that the display elements or LEDs flash.

In the exemplary embodiment of FIG. 3 or FIG. 4, each on/off period $T_{ea}$ begins with the switched-on state E. In this case, if the value Z of the bus message counter is above the changeover limit U, the control signal $S_{ea}$ is produced, which takes the display element 15 from the switched-on state E to the switched-off state A. The control signal $S_{ae}$, which takes the display element 15 from the switched-off state A back into the switched-on state E, is produced when the value Z of the bus message counter is reset.

For a better understanding, there now follows a specific example of the evaluation of the bus message counter or the control algorithm with reference to the example of FIG. 3 (twinkling) and FIG. 4 (flashing). In this case, it is assumed that the value range W of the bus message counter is 65 536. The following parameters are therefore obtained:

W=65 536

$V^*_{twinkle} = 1/2$ $V^*_{flash} = 1/5$.

For an implementation in a control unit or a processor with and without floating point computation, the following calculation would be performed:

$$U_{twinkle} = W \cdot V^*_{twinkle} = 65\ 536 \cdot 1/2 = 32\ 768$$

$$U_{flash} = W \cdot V^*_{flash} = 65\ 536 \cdot 1/5 = 13\ 107.2 \text{ (with floating point computation) or } 13\ 107 \text{ (without floating point computation)}.$$

The value Z ranges from 0 to W−1, i.e. in this case 65 535, and is incremented by one each time. Accordingly, on the basis of the pseudo code indicated above, the result of the modulo Z % W also ranges from 0 to 65 535. While Z % W (i.e. Z % 65 536) is less than U (i.e. in this case 32 768 for twinkling), the display element or the LED is switched on. This is denoted in a pseudo code by the signal LED=on, which indicates the switched-on state. As soon as the modulo Z % W becomes equal to or greater than the changeover limit U (i.e. in this case 32 768 for twinkling), the display element or the LED is switched off. This is denoted in the pseudo code by the signal LED=off, which indicates the switched-off state. The control signal $S_{ea}$, which takes the display element from the switched-on state to the switched-off state, is thus produced in this case when the signal changes (from LED=on to LED=off).

In contrast to FIG. 3 and FIG. 4, in the exemplary embodiment of FIG. 5 and the exemplary embodiment of FIG. 6, the value range period $T_W$ is not equal to the on/off period $T_{ea}$, but rather is divisible multiple times by the on/off period $T_{ea}$ (without remainder). In this case, the integer is thus a multiple (i.e. greater than one). The value range period $T_W$ is thus an integer multiple of the defined on/off period $T_{ea}$. Hence, the defined on/off period $T_{ea}$ is an integer portion of the value range period $T_W$. The value range W of the bus message counter is thus split into a plurality of on/off periods $T_{ea}$. In the exemplary embodiment of FIG. 5 or FIG. 6, the integer is 4. However, it should be understood that this is dependent on the corresponding implementation.

If the value range period $T_W$ is divisible by the on/off period $T_{ea}$ multiple times (without remainder), as shown in the exemplary embodiment of FIG. 5 and the exemplary embodiment of FIG. 6, the evaluation or the control algorithm can preferably proceed as follows: the integer multiple defines a scaling factor F. The scaling factor is preferably ascertained by ascertaining the quotient of value range period $T_W$ and the desired on/off period $T^*_{ea}$, and integer rounding of said quotient is then performed, the rounding result of which defines the scaling factor F:

$$T_W = W \cdot T_{bus}$$

$$F = \mathrm{round}(T_W/T^*_{ea})$$

for a processor with floating point computation, or $$F = (T_W + T^*_{ea}/2)/T^*_{ea}$$

for a processor without floating point computation.

As mentioned previously, the changeover limit is also ascertained as the product of the value range W and the desired duty ratio $V^*$:

$$U = W \cdot V^*.$$

The modulo from the value Z of the bus message counter and the quotient of value range W and scaling factor F is then compared with the quotient of defined changeover limit U and scaling factor F. The control signal is produced if the modulo reaches or is above or below the quotient of defined changeover limit U and scaling factor F.

By way of example, this evaluation or the control algorithm can be described using the following pseudo code:

```
If (LED == target_twinkle)
{
    If (Z% (W/F) < (U/F))
    {
        LED = on
    }
    else
    {
        LED = off
    }
}
```

As can be seen in this pseudo code, any evaluation prompts the production of a signal (LED=on or LED=off) that indicates the switched-on or switched-off state of the display element. The control signal $S_{ea}$ or $S_{ae}$ will be produced when the signal changes. As can be seen in FIG. 5a and FIG. 6a, the value Z ranges from 0 to W−1 and is incremented by one each time. While Z % (W/F) is less than U/F, the display element or the LED is switched on. This is denoted in the pseudo code by the signal LED=on, which indicates the switched-on state. As soon as the modulo Z % (W/F) becomes equal to or greater than the U/F, the display element or the LED is switched off. This is denoted in the pseudo code by the signal LED=off, which indicates the switched-off state. The control signal $S_{ea}$, which takes the display element from the switched-on state to the switched-off state, is thus produced in this case when the signal changes from LED=on to LED=off. The control signal $S_{ae}$, which takes the display element from the switched-off state to the switched-on state, is produced when the signal changes from LED=off back to LED=on.

In the exemplary embodiment of FIG. 5 or of FIG. 6, each on/off period $T_{ea}$ begins with the switched-on state E. In this case, whenever the modulo from the value Z divided by the quotient of value range W and scaling factor F is above the quotient of defined changeover limit U and scaling factor F, the control signal $S_{ea}$ is produced, which takes the display element 15 from the switched-on state E to the switched-off state A. The display element 15 is put into the switched-on state E when or while the modulo is less than the quotient of defined changeover limit U and scaling factor F, and the display element 15 is put into the switched-off state when or while the modulo is equal to or greater than the quotient of defined changeover limit U and scaling factor F.

In the exemplary embodiment of FIG. 5 or FIG. 6, it is possible, at least approximately, for both a desired duty ratio $V^*$ and a desired on/off period $T^*_{ea}$ to be attained. In this case, the determined, i.e. actual, on/off period $T_{ea}$ can differ from the desired on/off period $T^*_{ea}$ if the value range period is not an integer multiple of the desired on/off period. The integer division can thus result in discrepancies in the desired on/off period $T^*_{ea}$ from the actually indicated on/off period $T_{ea}$. This is particularly dependent on the value range period $T_W$, and therefore on the chosen bus cycle time $T_{bus}$ and/or the value range W. This discrepancy normally amounts to a few percent, however, which is imperceptible to the user, however (e.g. an on/off period of 1100 ms instead of 1000 ms). The same applies to a discrepancy in the desired duty ratio $V^*$ from the actual duty ratio V.

The percentage discrepancy A (indicated in percent %) in the actual on/off period $T_{ea}$ from the desired on/off period $T^*_{ea}$ that arises as a result of the integer division can be calculated as follows:

$$A = [((T_W/F) - T^*_{ea}) \cdot 100]/T^*_{ea}.$$

This discrepancy can be minimized by a relatively involved method. This can be achieved by customizing the value range, for example by virtue of manual zeroing if a particular value of the bus message counter is exceeded. In particular, the new value range may be smaller than the value range stipulated by the magnitude of the bus message counter in the bus message. In this case, the new value range can be chosen such that for the scaling factor F, if calculated as a floating point number, a value without a division remainder is always obtained. The new value range or the overflow value needs to be explicitly communicated to the message receivers in this case. Purely by way of example, the magnitude of the bus message counter may be 16 bits, which means that a value range of 65 536 is obtained, with the bus message counter ranging from 0 to 65 535, i.e. if the value 65 535 is incremented the value is set to 0. Manual zeroing can then be effected by virtue of the value range being only 10 000, for example, i.e. 10 000 different values. In this case, the value is set to 0 manually when the value 9999 is incremented.

The value range W can be matched to the bus message time interval $T_{Bus}$. By way of example, the value range or the magnitude of the bus message counter can be increased or reduced. By way of example, for a very short bus message time interval $T_{Bus}$ and/or a relatively long on/off period $T_{ea}$, the magnitude of the bus message counter can be increased (e.g. from 16 bits to 32 bits), particularly no later than when the on/off period $T_{ea}$ becomes longer than the value range period $T_W$.

By way of example, the value range can be chosen such that the value range period $T_W$ is greater than or at least equal to the on/off period $T_{ea}$. In particular, in order to cover a determined time range for the bus message time interval (e.g. between 63 μs and 10 ms), the value range W can be chosen such that the value range period $T_W$ is always greater than or at least equal to the on/off period $T_{ea}$. By way of example, in the case of a bus message time interval $T_{bus}$ of 32 μs and in order to implement an on/off period $T_{ea}$ of 1 s (1 000 000 μs), the value range would need to be at least 31 250, i.e. the magnitude of the bus message counter must be at least 15 bits (corresponds to a value range of 32 768).

For a better understanding, there now follows specific examples of the evaluation of the bus message counter or the control algorithm with reference to the example of FIG. 5 (twinkling) and FIG. 6 (flashing). In this case, it is assumed that the value range W of the bus message counter is 65 536.

Example 1

There follows a first example with a very short bus message time interval $T_{bus}$. The following parameter values are assumed:

W=65 536
$T_{Bus}$=63 μs
$V^*_{twinkle}$=½
$V^*_{flash}$=⅕
$T^*_{ea}$=1 000 000 μs=1 s A processor with floating point computation then performs the following calculations:

$T_W = W \cdot T_{bus} = 65\ 536 \cdot 63\ \mu s = 4\ 128\ 768\ \mu s$ $F = \text{round}(T_W/T^*_{ea}) = \text{round}(4\ 128\ 768\ \mu s/1\ 000\ 000\ \mu s) = \text{round}(4\ 128\ 768) = 4$ $U_{twinkle} = \text{round}(W \cdot V^*_{twinkle}) = \text{round}(65\ 536 \cdot ½) = 32\ 768$ $U_{flash} = \text{round}(W \cdot V^*_{flash}) = \text{round}(65\ 536 \cdot \frac{1}{5}) = 13\ 107$ By contrast, a processor without floating point computation performs the following calculations:

$T_W = W \cdot T_{bus} = 65\ 536 \cdot 63\ \mu s = 4\ 128\ 768\ \mu s$ $F = (T_W + T_{ea}/2)/T^*_{ea} = (4\ 128\ 768\ \mu s + 1\ 000\ 000\ \mu s/2)/1\ 000\ 000\ \mu s = (4\ 128\ 768\ \mu s + 500\ 000\ \mu s)/1\ 000\ 000\ \mu s = 4\ 628\ 768\ \mu s/1\ 000\ 000\ \mu s = 4$ $U_{twinkle} = W \cdot V^*_{twinkle} = 65\ 536/2 = 32\ 768$ $U_{flash} = W \cdot V^*_{flash} = 65\ 536/5 = 13\ 107$ The following pseudo code is obtained for the first example:

```
If (LED == target_twinkle)
{
  If ((Z% 16 384) < 8192)
  {
    LED = on
  }
  else
  {
    LED = off
  }
}
If (LED == target_flash)
{
  If ((Z% 16 384) < 3276)
  {
    LED = on
  }
  else
  {
    LED = off
  }
}
```

For this first example, the following is therefore obtained for the percentage discrepancy:

$\Delta\% = [((4\ 128\ 768\ \mu s/4) - 1\ 000\ 000\ \mu s) \cdot 100]/1\ 000\ 000\ \mu s = 3.2\%$ The discrepancy in the actual twinkling/flashing from the desired twinkling/flashing is small in this case, since the division remainders are distributed over very many bus message time intervals or bus cycles.

Example 2

There follows a second example with a very long bus message time interval $T_{Bus}$. The following parameter values are assumed:

W=65 536
$T_{Bus}$=10 000 μs
$V^*_{twinkle}$=½
$V^*_{flash}$=⅕
$T^*_{ea}$=1 000 000 μs=1 s A processor without floating point computation performs the following calculations:

$T_W = W \cdot T_{bus} = 65\ 536 \cdot 10\ 000\ \mu s = 655\ 360\ 000\ \mu s$ $F = (T_W + T^*_{ea}/2)/T^*_{ea} = (655\ 360\ 000\ \mu s + 500\ 000\ \mu s)/1\ 000\ 000\ \mu s = 655$ $U_{twinkle} = W \cdot V^*_{twinkle} = 65\ 536/2 = 32\ 768$ $U_{flash} = W \cdot V^*_{flash} = 65\ 536/5 = 13\ 107$ The following pseudo code is obtained:

```
If (LED == target_twinkle)
{
  If ((Z% 100) < 50)
  {
    LED = on
  }
  else
  {
    LED = off
  }
}
If (LED == target_flash)
{
  If ((Z% 100) < 20)
  {
    LED = on
  }
  else
  {
    LED = off
  }
}
```

For this second example, the following is therefore obtained for the percentage discrepancy:

$\Delta\% = [((655\ 360\ 000\ \mu s/655) - 1\ 000\ 000\ \mu s) \cdot 100]/1\ 000\ 000\ \mu s = 0.055\%$ The discrepancy in the actual twinkling/flashing from the desired twinkling/flashing is small in this case, since the division remainders are distributed over very many bus message time intervals or bus cycles, on account of the very slow or long bus message time interval.

A problem becomes clear in this example in as much as the last values of the value range can be "left over" or there may be a remainder. In this example, 655 on/off periods fit into a value range period, but at the end there are 36 values or bus cycles "left over" that cannot be distributed. As is evident from the pseudo code, the display element or LED would be switched on for 36·10 ms and would remain switched on when a new value range period begins. This could result in "synchronous hiccupping" in all display elements or LEDs after approximately 10 minutes. This problem could be avoided by matching the value range to 65 500.

Example 3

The third example, below, shows the greatest possible discrepancy. By way of example, this is the case if a remainder of ½·T*$_{ea}$ were to be obtained for the division or the quotient of the value range period T$_W$ by the desired on/off period T*$_{ea}$. In the present specific example, the greatest possible discrepancy would be obtained when the value range period T$_W$ is in the range around 4.5 s for a desired on/off period of 1 s. This will be the case, during the constant value range, with a bus message time interval T$_{bus}$ of approximately 69 μs. Therefore, the following parameter values are assumed:

W=65 536
T$_{Bus}$=69 μs
V*$_{twinkle}$=½
V*$_{flash}$=⅕
T*$_{ea}$=1 000 000 μs=1 s A processor without floating point computation then performs the following calculations:

$$T_W = W \cdot T_{bus} = 65\,536 \cdot 69\,\mu s = 4\,521\,984\,\mu s$$

$$F = (T_W + T^*_{ea}/2)/T^*_{ea} = (4\,521\,984\,\mu s + 500\,000\,\mu s)/1\,000\,000\,\mu s = 5$$

$$U_{twinkle} = W \cdot V^*_{twinkle} = 65\,536/2 = 32\,768$$

$$U_{flash} = W \cdot V^*_{flash} = 65\,536/5 = 13\,107$$

The following pseudo code is obtained:

```
If (LED == target_twinkle)
{
    If ((Z% 13 107) < 8192)
    {
        LED = on
    }
    else
    {
        LED = off
    }
}
If (LED == target_flash)
{
    If ((Z% 13 107) < 3276)
    {
        LED = on
    }
    else
    {
        LED = off
    }
}
```

For the example above, the following is therefore obtained for the percentage discrepancy:

$$\Delta\% = [((4\,521\,984\,\mu s/5) - 1\,000\,000\,\mu s) \cdot 100]/1\,000\,000\,\mu s = -9.56\%$$

In this case, the actual on/off period T$_{ea}$ is thus approximately 904 ms instead of the value 1000 ms of the desired on/off period T*$_{ea}$. Such a small discrepancy is not really of any consequence, however.

Example 4

In order to provide a little clarification for the substantive matter with the discrepancy again, the limit of the value range period T$_W$, in this specific case the limit of 4.5 s, is yet to be approached from the bottom. The following parameter values are assumed:

W=65 536
T$_{Bus}$=68 μs
V*$_{twinkle}$=½
V*$_{flash}$=⅕
T*$_{ea}$=1 000 000 μs=1 s A processor without floating point computation then performs the following calculations:

$$T_W = W \cdot T_{bus} = 65\,536 \cdot 68\,\mu s = 4\,456\,380\,\mu s$$

$$F = (T_W + T^*_{ea}/2)/T^*_{ea} = (4\,456\,380\,\mu s + 500\,000\,\mu s)/1\,000\,000\,\mu s = 4$$

$$U_{twinkle} = W \cdot V^*_{twinkle} = 65\,536/2 = 32\,768$$

$$U_{flash} = W \cdot V^*_{flash} = 65\,536/5 = 13\,107$$

The following pseudo code is obtained:

```
If (LED == target_twinkle)
{
    If ((Z% 13 107) < 8192)
    {
        LED = on
    }
    else
    {
        LED = off
    }
}
If (LED == target_flash)
{
    If ((Z% 13 107) < 3276)
    {
        LED = on
    }
    else
    {
        LED = off
    }
}
```

For the example above, the following is therefore obtained for the discrepancy:

$$\Delta\% = [((4\,456\,380\,\mu s/4) - 1\,000\,000\,\mu s) \cdot 100]/1\,000\,000\,\mu s = 11.41\%$$

In this case, the actual on/off period T$_{ea}$ is thus approximately 1114 ms instead of the value 1000 ms of the desired on/off period T*$_{ea}$.

It should be noted that for the bus message time intervals between 63 µs and 10 ms that are shown in the specific examples 1 to 4 in this case, the discrepancy can never be greater than 12.5% and is greatest for a bus message time interval of 68.66 µs. In the case of longer bus message time intervals, the percentage discrepancy becomes smaller and smaller in "zigzag" fashion.

What is claimed is:

1. A method for operating a control system having subscribers connected via a bus, said subscribers comprising a message transmitter and a first and a second message receiver, wherein the first and second message receivers each comprise a display element, which can be toggled between a switched-on state and a switched-off state, and wherein the first and second message receivers each comprise a control unit for producing a control signal that toggles the display element between the switched-on state and the switched-off state; the method including steps for synchronizing the display elements of said first and second message receivers, wherein
the message transmitter cyclically sends a respective bus message via the bus in defined recurring bus message time intervals, the respective bus message comprising a bus message counter that has a respective value from a defined value range,
the message transmitter changes the value in a predefined manner for each respective bus message to be sent, with the value being reset when the end of the value range is reached,
the first and second message receivers each receive the respective bus message via the bus, and
the control units in each of the first and second message receivers evaluate the bus message counter and take this as a basis for producing the control signal, so that the display elements of the first and second message receivers are toggled between the switched-on state and the switched-off state in sync with one another and with a defined on/off period that is a function of the bus message counter;
wherein the first and second message receivers each store at least one of the bus message time interval, the defined value range, a desired on/off period and a desired duty ratio for toggling the display element.

2. The method of claim 1, wherein the control unit of the first message receiver evaluates the bus message counter using a first algorithm and the control unit of the second message receiver evaluates the bus message counter using a second algorithm, the first and second algorithms being the same.

3. The method of claim 1, wherein the control unit of at least one message receiver evaluates the bus message counter by means of integer division.

4. The method of claim 1, wherein the control unit evaluates the respective bus message counter using a modulo operation in order to determine a toggling threshold.

5. The method of claim 1, wherein the defined on/off period indicates an operating state of the control system.

6. The method of claim 5, wherein the operating state is an error state.

7. The method of claim 1, further comprising the steps of:
defining a first set of first and second message receivers and toggling the display elements of said first set of first and second message receivers in sync with one another using a first defined on/off period, and
defining a second set of first and second message receivers and toggling the display elements of said second set of first and second message receivers in sync with one another using a second defined on/off period.

8. A method for operating a control system having subscribers connected via a bus, said subscribers comprising a message transmitter and a first and a second message receiver, wherein the first and second message receivers each comprise a display element, which can be toggled between a switched-on state and a switched-off state, and wherein the first and second message receivers each comprise a control unit for producing a control signal that toggles the display element between the switched-on state and the switched-off state; the method including steps for synchronizing the display elements of said first and second message receivers, wherein
the message transmitter cyclically sends a respective bus message via the bus in defined recurring bus message time intervals, the respective bus message comprising a bus message counter that has a respective value from a defined value range,
the message transmitter changes the value in a predefined manner for each respective bus message to be sent, with the value being reset when the end of the value range is reached,
the first and second message receivers each receive the respective bus message via the bus, and
the control units in each of the first and second message receivers evaluate the bus message counter and take this as a basis for producing the control signal, so that the display elements of the first and second message receivers are toggled between the switched-on state and the switched-off state in sync with one another and with a defined on/off period that is a function of the bus message counter;
wherein the control unit of at least one message receiver counts the respective number of bus messages within a defined period of time and uses this number and the defined period of time to ascertain the bus message time interval.

9. A method for operating a control system having subscribers connected via a bus, said subscribers comprising a message transmitter and a first and a second message receiver, wherein the first and second message receivers each comprise a display element, which can be toggled between a switched-on state and a switched-off state, and wherein the first and second message receivers each comprise a control unit for producing a control signal that toggles the display element between the switched-on state and the switched-off state; the method including steps for synchronizing the display elements of said first and second message receivers, wherein
the message transmitter cyclically sends a respective bus message via the bus in defined recurring bus message time intervals, the respective bus message comprising a bus message counter that has a respective value from a defined value range,
the message transmitter changes the value in a predefined manner for each respective bus message to be sent, with the value being reset when the end of the value range is reached,
the first and second message receivers each receive the respective bus message via the bus, and
the control units in each of the first and second message receivers evaluate the bus message counter and take this as a basis for producing the control signal, so that the display elements of the first and second message receivers are toggled between the switched-on state and the switched-off state in sync with one another and with a defined on/off period that is a function of the bus message counter;

wherein the control unit of at least one message receiver ascertains a product of the value range and a desired duty ratio in order to determine a toggling threshold.

10. A method for operating a control system having subscribers connected via a bus, said subscribers comprising a message transmitter and a first and a second message receiver, wherein the first and second message receivers each comprise a display element, which can be toggled between a switched-on state and a switched-off state, and wherein the first and second message receivers each comprise a control unit for producing a control signal that toggles the display element between the switched-on state and the switched-off state; the method including steps for synchronizing the display elements of said first and second message receivers, wherein the message transmitter cyclically sends a respective bus message via the bus in defined recurring bus message time intervals, the respective bus message comprising a bus message counter that has a respective value from a defined value range, the message transmitter changes the value in a predefined manner for each respective bus message to be sent, with the value being reset when the end of the value range is reached, the first and second message receivers each receive the respective bus message via the bus, and the control units in each of the first and second message receivers evaluate the bus message counter and take this as a basis for producing the control signal, so that the display elements of the first and second message receivers are toggled between the switched-on state and the switched-off state in sync with one another and with a defined on/off period that is a function of the bus message counter;

wherein the control unit of at least one message receiver ascertains a product of the value range and the bus message time interval in order to determine a value range period, and wherein the control unit of said at least one message receiver selects the defined on/off period such that the value range period is an integer multiple of the defined on/off period.

11. A method for operating a control system having subscribers connected via a bus, said subscribers comprising a message transmitter and a first and a second message receiver, wherein the first and second message receivers each comprise a display element, which can be toggled between a switched-on state and a switched-off state, and wherein the first and second message receivers each comprise a control unit for producing a control signal that toggles the display element between the switched-on state and the switched-off state; the method including steps for synchronizing the display elements of said first and second message receivers, wherein the message transmitter cyclically sends a respective bus message via the bus in defined recurring bus message time intervals, the respective bus message comprising a bus message counter that has a respective value from a defined value range, the message transmitter changes the value in a predefined manner for each respective bus message to be sent, with the value being reset when the end of the value range is reached, the first and second message receivers each receive the respective bus message via the bus, and the control units in each of the first and second message receivers evaluate the bus message counter and take this as a basis for producing the control signal, so that the display elements of the first and second message receivers are toggled between the switched-on state and the switched-off state in sync with one another and with a defined on/off period that is a function of the bus message counter;

wherein the control unit of at least one message receiver ascertains a product of the value range and the bus message time interval in order to determine a value range period, ascertains a quotient of value range period and a desired on/off period, and performs integer rounding of said quotient in order to determine a toggling threshold.

* * * * *